United States Patent
Bellino et al.

(10) Patent No.: US 11,364,769 B2
(45) Date of Patent: Jun. 21, 2022

(54) VEHICLE CABIN THERMAL MANAGEMENT SYSTEM AND CONTROL METHODS

(71) Applicant: Ford Global Technologies, LLC, Dearborn, MI (US)

(72) Inventors: Mary Bellino, Dearborn, MI (US); Nicholas David Moore, Dearborn, MI (US); Joseph George, Canton, MI (US); Rohan Shrivastava, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 16/717,298

(22) Filed: Dec. 17, 2019

(65) Prior Publication Data

US 2021/0178859 A1    Jun. 17, 2021

(51) Int. Cl.
*B60H 1/00* (2006.01)
*B60H 1/32* (2006.01)

(52) U.S. Cl.
CPC ........... *B60H 1/00885* (2013.01); *B60H 1/00* (2013.01); *B60H 1/00385* (2013.01); *B60H 1/00428* (2013.01); *B60H 1/00485* (2013.01); *B60H 1/00792* (2013.01); *B60H 1/323* (2013.01); *B60H 1/32281* (2019.05);
(Continued)

(58) Field of Classification Search
CPC .. B60H 1/00; B60H 1/00385; B60H 1/00428; B60H 1/00485; B60H 1/00792; B60H 1/00885; B60H 1/32281; B60H 1/323; B60H 2001/00928; B60H 2001/00949; B60H 2001/3263; B60H 2001/3283;
(Continued)

(56) References Cited

U.S. PATENT DOCUMENTS 6,016,662 A * 1/2000 Tanaka ...................... F25B 5/02
62/199
6,983,793 B2    1/2006 Zheng et al.
(Continued)

FOREIGN PATENT DOCUMENTS

CN          001482015 A      3/2004

*Primary Examiner* — Larry L Furdge
*Assistant Examiner* — Chang H Park
(74) *Attorney, Agent, or Firm* — David B. Kelley; Brooks Kushman P.C.

(57) ABSTRACT

A thermal management system for a passenger cabin of a hybrid vehicle includes a refrigerant loop in fluid communication with a compressor, a condenser, and a chiller. A main cabin evaporator is in fluid communication with the refrigerant loop. A first valve is configured to regulate refrigerant flow through the main cabin evaporator. A temperature sensor disposed at the main cabin evaporator is configured to output a signal indicative of a main cabin evaporator temperature. An auxiliary evaporator is in fluid communication with the refrigerant loop. A second valve is configured to regulate refrigerant flow through the auxiliary evaporator. A controller is programmed to, in response to the main cabin evaporator temperature being less than a threshold while the main cabin evaporator is operated with the second valve closed, open the second valve to cycle refrigerant through the auxiliary evaporator to increase the main cabin evaporator temperature.

17 Claims, 3 Drawing Sheets

(52) U.S. Cl.
CPC .............. *B60H 2001/00928* (2013.01); *B60H 2001/00949* (2013.01); *B60H 2001/3263* (2013.01); *B60H 2001/3283* (2013.01)

(58) Field of Classification Search
CPC .. F24F 11/41; F24F 11/43; F24F 11/83; F24F 11/84
See application file for complete search history.

(56) References Cited

U.S. PATENT DOCUMENTS

| | | |
|---|---|---|
| 10,173,498 B2 | 1/2019 | Uehara et al. |
| 2005/0198980 A1 | 9/2005 | Cowell |
| 2006/0162355 A1 | 7/2006 | Nakayama |
| 2011/0082594 A1 | 4/2011 | Dage et al. |
| 2012/0266622 A1 | 10/2012 | Inaba et al. |
| 2012/0291467 A1 | 11/2012 | Sasaki et al. |
| 2012/0297809 A1 | 11/2012 | Carpenter |
| 2013/0139529 A1 | 6/2013 | Lu et al. |
| 2014/0007599 A1 | 1/2014 | Cavarretta |
| 2014/0345307 A1 | 11/2014 | Bagley et al. |
| 2016/0339760 A1 | 11/2016 | Dunn et al. |
| 2017/0313158 A1 | 11/2017 | Porras et al. |
| 2018/0022188 A1 | 1/2018 | Kakizaki et al. |
| 2019/0092117 A1 | 3/2019 | Vehr et al. |

\* cited by examiner

VEHICLE CABIN THERMAL MANAGEMENT SYSTEM AND CONTROL METHODS

TECHNICAL FIELD

The present disclosure relates to a thermal management system for a vehicle passenger cabin, and a control strategy and method for operating a thermal management system.

BACKGROUND

Vehicles may be provided with a thermal management system such as a heating, ventilation, and air conditioning (HVAC) system. The air conditioning function of the system provides cooling to control vehicle cabin temperature for occupant comfort. Operation of the air conditioning function during low ambient temperatures may allow an evaporator of the thermal management system to reach low operating temperatures. If the operating temperatures are sufficiently low, the evaporator may experience icing and degraded performance of the air conditioning function. In order to de-ice an evaporator, a compressor for the thermal management system may be turned off such that the air conditioning function is disabled until the evaporator temperature rises and the evaporator de-ices.

SUMMARY

A thermal management system for a passenger cabin of a hybrid vehicle includes a refrigerant loop in fluid communication with a compressor, a condenser, and a chiller. A main cabin evaporator is in fluid communication with the refrigerant loop. A first valve is configured to regulate refrigerant flow through the main cabin evaporator. A temperature sensor disposed at the main cabin evaporator is configured to output a signal indicative of a main cabin evaporator temperature. An auxiliary evaporator is in fluid communication with the refrigerant loop. A second valve is configured to regulate refrigerant flow through the auxiliary evaporator. A controller is programmed to, in response to the main cabin evaporator temperature being less than a first temperature threshold while the main cabin evaporator is operated with the second valve closed and the compressor operating at less than a predetermined operating speed, open the second valve to cycle refrigerant through the auxiliary evaporator to cause an increase in the main cabin evaporator temperature.

A method of controlling a thermal management system having a plurality of evaporators includes operating a compressor to cycle refrigerant through a refrigerant loop and opening a first valve to allow refrigerant to flow through a main cabin evaporator. The method also includes closing a second valve to prevent refrigerant to flow through an auxiliary evaporator and sensing a temperature indicative of a main cabin evaporator temperature. The method further includes, in response to the main cabin evaporator temperature being less than a first temperature threshold while the second valve is closed, opening the second valve to cycle refrigerant through the auxiliary evaporator to cause an increase in the main cabin evaporator temperature. The method further includes closing the second valve in response to the main cabin evaporator temperature increasing to greater than a second temperature threshold while the second valve is open.

A vehicle includes a compressor in fluid communication with a refrigerant loop and operable to generate a refrigerant pressure increase causing flow through the refrigerant loop. A main cabin evaporator is in fluid communication with the refrigerant loop to provide cooling for a first vehicle cabin zone. A first valve is configured to regulate refrigerant flow through the main cabin evaporator. A temperature sensor is disposed at the main cabin evaporator and is configured to output a signal indicative of a main cabin evaporator temperature. An auxiliary evaporator is in fluid communication with the refrigerant loop to provide cooling for a second vehicle cabin zone. A second valve is configured to regulate refrigerant flow through the auxiliary evaporator. The vehicle also includes a controller programmed to open the first valve and close the second valve in response to a cooling request corresponding to the first vehicle cabin zone to cycle refrigerant through the main cabin evaporator. The controller is also programmed to open the second valve to cycle refrigerant through the auxiliary evaporator to cause an increase in the main cabin evaporator temperature in response to the main cabin evaporator temperature being less than a first temperature threshold while the main cabin evaporator is operated with the second valve closed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle thermal management systems may include two or more evaporators to support air conditioning functions to independently cool air in front and rear portions of a vehicle cabin. In some examples, a dual evaporator air conditioning system includes a primary heating, ventilation, and air conditioning (HVAC) unit to cool the front portion of the vehicle cabin and an auxiliary HVAC unit to cool the rear portion of the cabin. The primary HVAC unit includes a main cabin evaporator and the auxiliary HVAC unit includes an auxiliary evaporator. The primary and auxiliary evaporators are fluidly connected to a common compressor and common condenser via a refrigerant loop. The compressor compresses and circulates refrigerant to the condenser. The condenser cools and condenses the refrigerant, which is then circulated to both the primary and auxiliary evaporators.

In some examples, the primary evaporator may be held by a primary housing and used to transfer heat from the air to the cycled refrigerant. A blower moves the air across the primary evaporator, and air ducts may be configured to direct the cooled air into a front portion of the vehicle cabin. The auxiliary evaporator may be held by a separate auxiliary housing and also used to transfer heat from the air to the cycled refrigerant. However, air ducts in connection with he auxiliary evaporator may be configured to direct the air into the rear portion of the cabin.

Generally, the compressor is activated to circulate refrigerant when the primary HVAC unit is in a cooling mode (e.g., a user has requested cooled air for the front portion of the vehicle cabin). The auxiliary HVAC unit may also be activated to provide cooling, for example, if a user has requested cooled air for the rear portion of the vehicle cabin. Alternatively, the auxiliary HVAC unit can remain in a non-cooling mode while the primary HVAC unit is operated in the cooling mode (e.g., a user has requested cooled air for the front portion, but not for the rear portion of the vehicle cabin). When the auxiliary HVAC unit is in a non-cooling mode, refrigerant may still be circulated through the auxiliary evaporator of the auxiliary HVAC unit to provide certain beneficial effects. As discussed in detail below, refrigerant may be cycled through the auxiliary evaporator to increase overall loads of the thermal management system to inhibit icing of the primary evaporator during low ambient temperature conditions.

Figure 1:
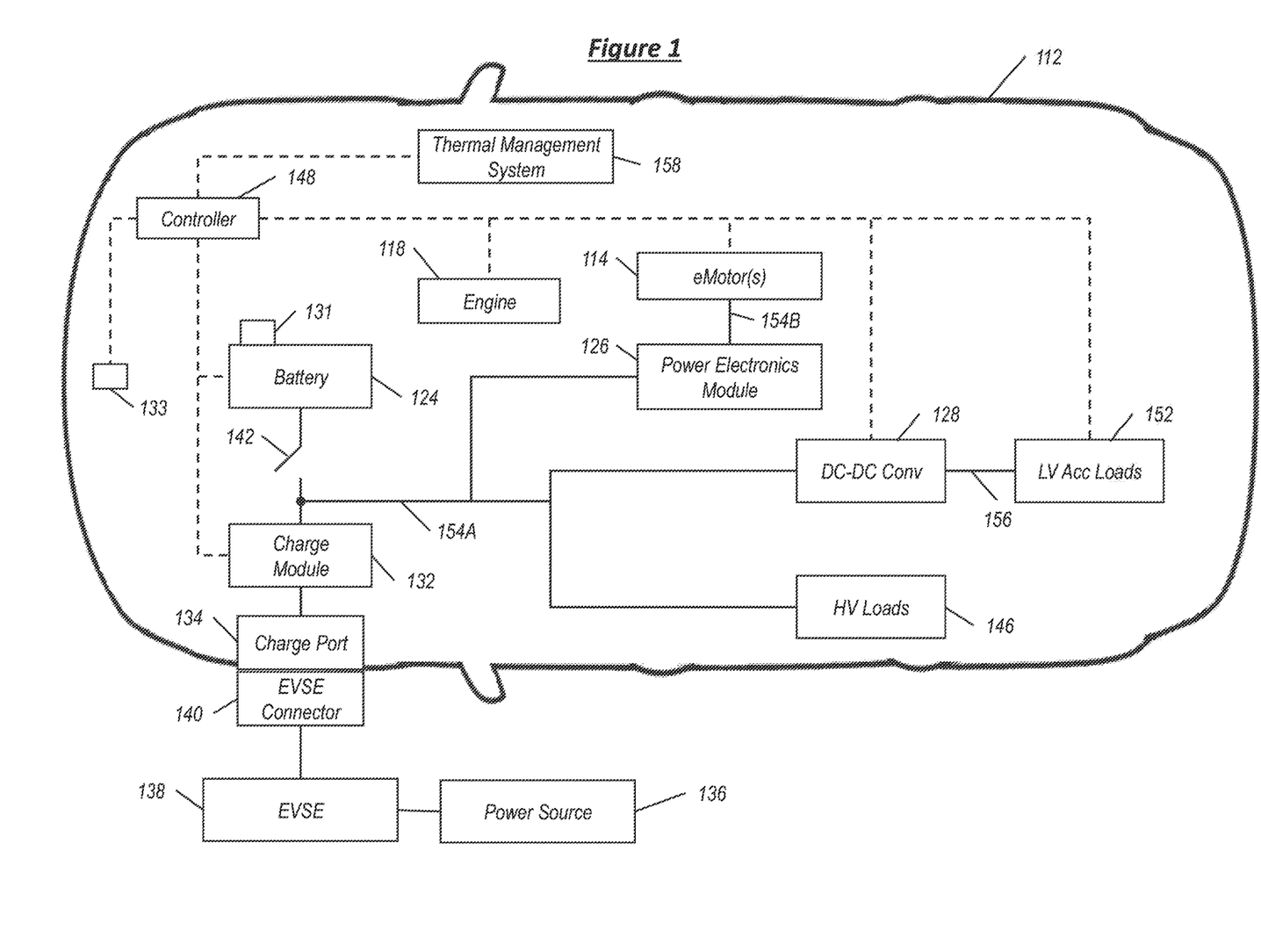
FIG. 1 is a schematic diagram of an example hybrid vehicle.

FIG. 1 depicts a hybrid-electric vehicle (HEV) 112. The HEV 112 includes an electrified propulsion system having one or more electric machines 114 mechanically coupled to a hybrid transmission (not shown). The electric machines 114 may be capable of operating as a motor or a generator. In addition, the hybrid transmission is mechanically coupled to an internal combustion engine 118 (i.e., ICE). The electric machines 114 are arranged to provide propulsion torque as well as slowing torque capability either while the engine 118 is operated or turned off. The electric machines 114 are capable of operating as generators to provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the engine 118 to operate near the most efficient speed and torque ranges. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or combustion engine 118.

A traction battery or battery pack 124 stores energy that can be used to power the electric machines 114. The battery pack 124 typically provides a high-voltage direct current (DC) output from one or more battery cell arrays, sometimes referred to as battery cell stacks, within the traction battery 24. Each battery cell array may include one or more battery cells. The battery cells, such as a prismatic, pouch, cylindrical, or other types of cells, are used to convert stored chemical energy to electrical energy. The cells may include a housing, a positive electrode (cathode) and a negative electrode (anode). An electrolyte allows ions to move between an anode and cathode during discharge, and then return during recharge. Terminals may allow current to flow out of the cell for use by the vehicle. Different battery pack configurations may be available to address individual vehicle variables including packaging constraints and power requirements. Discussed in more detail below, the battery cells may be thermally regulated by a thermal management system. Examples of thermal management systems include air cooling systems, liquid cooling systems and a combination of air and liquid systems.

One or more contactors 142 may selectively isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., a 12-volt battery). The low-voltage loads 152 may be electrically coupled to the low-voltage bus 156. The low-voltage loads 152 may include various controllers within the vehicle 112.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may also be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138. The EVSE 138 includes a charge connector 140 for plugging into a charge port 134 of the vehicle 112. The charge port 134 may be any type of port configured to transfer power from the EVSE 138 to the vehicle 112. The charge port 134 may be electrically coupled to a charge module or on-board power conversion module 132. The power conversion module 132 conditions power supplied from the EVSE 138 to provide the proper voltage and current levels to the traction battery 124. The power conversion module 132 interfaces with the EVSE 138 to coordinate the delivery of power to the vehicle 112. The EVSE connector 140 may have pins that mate with corresponding recesses of the charge port 134. Alternatively, various components described as being electrically coupled or connected may transfer power using wireless inductive coupling or other non-contact power transfer mechanisms. The charge components including the charge port 134, power conversion module 132, power electronics module 126, and DC-DC converter module 128 may collectively be considered part of a power interface system configured to receive power from the off-board power source 136.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components.

System controller 148, although represented as a single controller, may be implemented as one or more controllers. The controller 148 may monitor operating conditions of various vehicle systems. According to the example of FIG. 1, at least the electric machines 114, engine 118, traction battery 124, DC-DC converter 128, charging module 132, and high-voltage loads 146, low-voltage loads 152, and thermal management system 158 are in communication with the controller 148.

The controller 148 also generally includes any number of subcomponents such as microprocessors, ASICs, ICs, memory (e.g., FLASH, ROM, RAM, EPROM and/or EEPROM) and software code to co-act with one another to perform various operations. The subcomponents allow onboard processing of commands and execute any number of predetermined routines according to a desired timing or alternatively in response to one or more inputs received from vehicle systems. The processors may be coupled to non-persistent storage and/or persistent storage. In an example configuration, the non-persistent storage is RAM, and the persistent storage is flash memory. In general, persistent (non-transitory) storage can include all forms of storage that maintain data when a computer or other device is powered down. The controller 148 may also store predetermined data within the memory, such as "look up tables" that are based on calculations and/or test data. The controller communicates with other vehicle systems and sub-controllers over one or more wired or wireless vehicle connections and may use common bus protocols (e.g., CAN and LIN). Used herein, references to "a controller" refer to one or more controllers.

The traction battery 124 includes a current sensor to output a signal indicative of a magnitude and direction of current flowing into or out of the traction battery 124. The traction battery 124 also includes a voltage sensor to sense a voltage across terminals of the traction battery 124. The voltage sensor outputs a signal indicative of the voltage across the terminals of the traction battery 124. The traction battery 124 may also have one or more temperature sensors 131 such as thermistors or other types of temperature sensors. The temperature sensor 131 may be in communication with the controller 148 to provide data indicative of temperature of the battery cells.

A desired temperature operating range may also be specified for the traction battery. The temperature operating range may define upper and lower thermal limits within which the battery 124 is operated. In response to a sensed temperature approaching a thermal limit, operation of the traction battery 124 may be modified or other mitigation actions may be initiated to actively regulate temperature. According to some example configurations, the traction battery 24 as well as other vehicle components are thermally regulated with one or more thermal management systems.

The thermal management system 158 is configured for heating and cooling various vehicle components, including the vehicle cabin as a heating, ventilation, and air conditioning (HVAC) system. In some examples, the thermal management system 158 includes an electric compressor, and may additionally include one or more heaters. The thermal management system 158 is in communication with the controller 148 and activation and/or deactivation states may be caused by the controller 148. The activation and/or deactivation states of the thermal management system 158 can be based on, for example, the status of an operator actuated switch, or the automatic control of the climate control system based on related functions, such as window defrost. The thermal management system 158 may additionally be connected to a user interface to permit a user to set a temperature for the cabin.

The vehicle 112 is also equipped with one or more passenger cabin temperature sensors 133. In some examples, passenger cabin temperature sensors 133 include multiple sensors to provide separate signals each indicative of different regions of the vehicle. In a particular example, a temperature signal is provided for each of a front zone of the passenger cabin as well as a rear zone of the passenger cabin.

Figure 2:
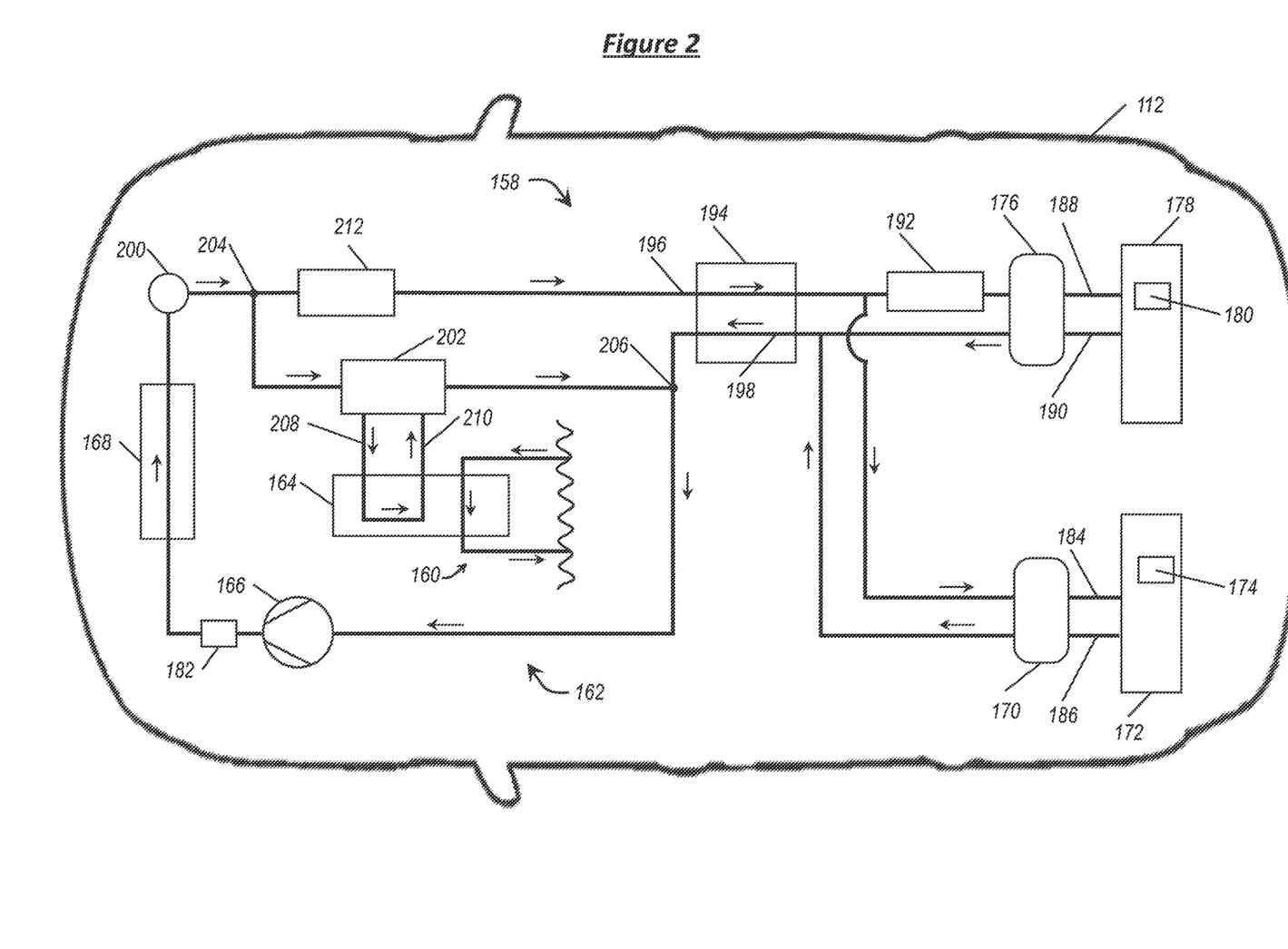
FIG. 2 is a schematic diagram of a thermal management system of a vehicle.

Referring to FIG. 2, the thermal management system 158 of vehicle 112 is depicted schematically. The thermal management system 158 is configured to regulate the temperature of the various zones of the passenger cabin. In some alternate examples the thermal management system is also configured to manage thermal loads generated by various vehicle components, such as the battery assembly 124, powertrain components, and power-electronic components. For example, the thermal management system 158 may be configured to selectively circulate coolant to the battery assembly 124 to either cool or heat the battery assembly depending on operating conditions.

FIG. 2 illustrates a schematic of an example thermal management system 158. The system 158 may include a fluid circuit or loop 160 that may be used as a coolant system for one or more vehicle electrical components such as a traction battery, inverter, charger, and the like. A second fluid circuit or loop is also provided and may operate as a cabin air conditioning system with a refrigeration circuit or loop 162. The refrigeration circuit 162 may be provided as a separate fluid loop from the coolant circuit 160 such that the fluid in one circuit does not mix with the fluid in the other circuit. Additionally, the fluids cycled through each circuit may be different from, or the same as, one another. As used herein, a fluid refers to a liquid-phase, a vapor-phase, or a mixed liquid-vapor phase for the fluid in the respective circuit. Additionally, the fluid may change phases within a respective circuit as it circulates. According to some examples, the fluid within coolant circuit 160 remains in a liquid phase during operation of the circuit, while the refrigerant cycled through the refrigerant circuit 162 may change phases within the circuit, for example, as in a vapor-compression refrigeration cycle.

The coolant circuit 160 is arranged to cooperate with a chiller 164 to provide thermal management for one or more components (not shown). The coolant circuit 160 may be provided with a cooling jacket or other fluid passages within or adjacent to one or more components to provide thermal management of the component. According to some examples, the components being cooled may include various components of the electric propulsion system discussed above, such as, for example traction battery 124, power electronics module 126, DC-DC converter 128, and/or charge module 132. The coolant circuit 160 may be configured to cool multiple components, for example, with the coolant flowing to the components arranged for parallel or series flow of coolant therethrough. Additionally, the coolant circuit 160 may have a single chiller 164 as shown, or multiple chillers 164 in various configurations.

In some alternate examples, the coolant circuit 160 may be provided with a heater, such as a PTC heater, valves, a reservoir, and other fluid system components that are not shown for simplicity. The coolant circuit 160 may further be provided with various sensors, for example, one or more temperature sensors on an associated component. Controller 148 operates the coolant circuit 160 to maintain operating temperatures of the component(s) within a predetermined temperature range, for example, while the vehicle is operating. The controller 148 may receive a request or set a flag indicating that operation of the coolant circuit 160 and chiller 164 is required to cool one or more components (e.g., a chiller on request).

The chiller 164 is provided as an internal heat exchanger with heat transferred between the coolant in the coolant circuit 160 and the refrigerant in the air conditioning refrigerant circuit 162. When the cooling circuit 160 is used to cool a component, heat from the coolant may be transferred to the refrigerant via the chiller 164.

The refrigerant circuit 162 is provided with an electric compressor 166, a condenser 168, a first valve assembly 170, a main cabin evaporator 172, and a main cabin evaporator temperature sensor 174. The compressor 166, the condenser 168, the first valve assembly 170, and the main cabin evaporator 172 are arranged sequentially, or in series. The refrigerant circuit 162 also includes a second valve assembly 176, rear auxiliary evaporator 178, and a rear evaporator temperature sensor 180. The rear auxiliary evaporator 178 may be arranged in parallel relative to the main cabin evaporator 172 along the refrigerant circuit 162.

The compressor 166 is an electrically driven compressor, and may be rotated via an electric motor. As such, the speed of the compressor 166 is controllable and variable. The compressor 166 has an associated minimum operating speed (e.g. 800-1000) which may be defined as a predetermined speed of the compressor. Below the minimum operating speed, the compressor is shut off or turned off. Alternatively, the predetermined speed may be set as a value that is higher than the minimum operating speed of the compressor 166. A pressure sensor 182 may be provided near an outlet of the compressor 166 for use in controlling the compressor.

The condenser 168 is provided as a heat exchanger for the vehicle that condenses the vapor phase refrigerant into a liquid phase via heat exchange with another medium. In the example shown, the condenser 168 is provided as a radiator near a front portion of the vehicle 112 to exchange heat between the refrigerant and outside air. Although only one condenser 168 is shown, the circuit may have more than one condenser.

The first valve assembly 170 is positioned to regulate upstream flow into an inlet 184 of the main cabin evaporator 172. The first valve assembly 170 acts as a throttle or an expansion valve for the main cabin evaporator 172 to allow for an expansion of the refrigerant and resulting phase change.

In one example, the first valve assembly 170 may be provided with an internal electronic throttle valve that is controlled by the controller 148, and may be moved between a closed position allowing for zero flow therethrough and a fully open position, and furthermore may be controlled to various partially open positions to meter flow therethrough. The electronic throttle valve provides for active control of the first valve assembly 170. The controller 148 may control the first valve assembly 170 as an electronic throttle valve to prevent refrigerant flow through the main cabin evaporator 172 or to meter or otherwise permit refrigerant flow through the main cabin evaporator 172. In some examples, the controller 148 may control the position of the electric throttle valve using a pressure from a pressure sensor at the outlet of the evaporator.

In some examples, the first valve assembly 170 may be arranged such that the internal throttle valve is immediately upstream of or at the inlet 184 to the main cabin evaporator 172. The first valve assembly 170 may also include a shutoff valve upstream of the internal throttle valve that is integrated into a single valve assembly housing. The shutoff valve may be mechanically or electrically controlled as an on/off valve with two positions (e.g., between a shut off position with zero flow therethrough and a full flow position.) The throttle valve may be controlled based on inputs indicative of a system state. In some examples, the first valve assembly 170 includes a pilot line fluidly connected to an outlet 186 of the main cabin evaporator 172 to control the position of the throttle valve via the pressure at the outlet of the evaporator. As the pressure of the refrigerant at the outlet 186 of the evaporator varies, the valve position for the throttle valve 124 likewise varies.

Similarly, the second valve assembly 176 is positioned to regulate upstream flow into an inlet 188 of the rear auxiliary evaporator 178. The second valve assembly 176 acts as a throttle or an expansion valve for the rear auxiliary evaporator 178 to allow for an expansion of the refrigerant and resulting phase change.

Much like previous descriptions, the second valve assembly 176 may also be provided with an internal electronic throttle valve controlled by the controller 148. The electronic throttle valve provides for active control of the second valve assembly 176. In some examples, the controller 148 may control the position of the electric throttle valve using a pressure from a pressure sensor near an outlet 190 of the evaporator.

As described above, the refrigerant circuit 162 includes more than one evaporator arranged for parallel flow relative to one another. Either of the main cabin evaporator 172 or the rear auxiliary evaporator 178 may be selected for use in controlling the circuit as described below. Alternatively, the control system may control the circuit based on any one of the evaporators reaching a predetermined condition. Also, each of the evaporators may be located to climatically influence different zones of the passenger cabin.

In some examples, and as illustrated in FIG. 2, the rear auxiliary evaporator 178 may be provided with a separate rear evaporator shutoff valve 192 (RESOV) that is upstream of both the second valve assembly 176 and the inlet 188 to the evaporator. The shutoff valve 192 may be mechanically or electrically controlled as an on/off valve with two discrete positions (e.g., capable of switching between a shut off position with zero flow therethrough and a full flow position). Alternatively, the shutoff valve 192 may be variable across a range of flow positions.

The main cabin evaporator 172 and rear auxiliary evaporator 178 are provided as dual heat exchangers for the vehicle that provide for heat transfer from air that is being directed to the cabin to the refrigerant to heat the refrigerant. The air may be outside air or may be recirculating passenger cabin air. Each of the main cabin evaporator 172 and rear auxiliary evaporator 178 are provided with temperature sensor 174 and temperature sensor 180, respectively. The temperature sensors measure a temperature indicative of each respective evaporator structure. For example, temperature data acquired may include: temperature at a fin of the evaporator, a refrigerant temperature, air temperature flowing through the evaporator, or air temperature at an exit of the evaporator to infer the evaporator temperature. The temperature sensors are in communication with the controller 148 and provide a signal indicative of the measured temperature to the controller 148.

In various examples, and as shown herein, the thermal management system 158 may be provided with an integrated heat exchanger 194, for example a counterflow or co-flow heat exchanger wherein heat is transferred from a first passage 196 connected to outlet lines of the each evaporator to a second passage 198 connect to the inlet lines of the evaporator. As depicted in FIG. 2, the 196 is positioned upstream of the first valve assembly 170 and second valve assembly 176. The integrated heat exchanger 194 also provides a second passage 198 positioned downstream of the outlet of evaporator 116. The first and second passages 196, 198 are arranged for heat transfer therebetween. In alternate examples according to the present disclosure, the refrigerant circuit 162 may be provided without an integrated heat exchanger.

The air conditioning circuit may also be provided with a receiver/dryer 200. Receiver/dryer 200 is configured to protect the function of other components of the thermal management system against moisture damage. The receiver/dryer 200 includes an internal desiccant that absorbs moisture from refrigerant cycled through the refrigerant circuit 162. Generally, the receiver/dryer operates to trap water circulating in the A/C loop, as well as filter out other particles and/or impurities. According to some examples, the receiver/dryer 200 is located along the high-pressure side of the refrigerant circuit 162, downstream of the condenser 168, and upstream of an expansion valve 202 discussed in more detail below. In other examples, the function of the receiver/dryer is provided by an accumulator that may be located along the low-pressure side of the refrigerant circuit between the evaporators 172, 178 and the compressor 166. In further examples, the receiver/dryer may be provided by a cartridge integrated as part of the condenser 168.

Under low environmental or outside air temperature conditions while operating the thermal management system 158 as an air conditioning system to cool the cabin, the temperature of either evaporator may approach zero degrees Celsius. Additionally, the evaporator may be operating at or below a dewpoint temperature of the air, and liquid condensation may occur on the evaporator, or within the evaporator if there is any moisture in the refrigerant circuit 162. At these low temperatures, ice crystals or condensation may form or develop on the evaporator surfaces and reduce flow through the evaporator and reduce performance of the air conditioning system such that it does not operate as requested by the user or by the controller. This may be referred to as icing or freezing of the evaporator. Conventionally, and in order to prevent ice or condensate formation in the evaporator, the compressor 166 may be cycled on and off to allow the main cabin evaporator 178 to warm up to temperatures where ice or condensate will not form. When the compressor 166 is cycled on and off, cabin cooling is interrupted, and this results in temperature swings in the evaporator 172 and associated swings in cabin air discharge temperatures and breath-level temperatures. The thermal management system 158 according to the present disclosure provides an alternative control method to cycling the compressor on and off, and is described in more detail below.

The refrigerant circuit 162 is also provided with the chiller 164 arranged for parallel flow with the evaporators 172, 178. The input lines to the main cabin evaporator 172 and rear auxiliary evaporator 178 relative to the chiller 164 split at point 204 downstream of the condenser 168 outlet. The outlet lines from the evaporator 116 and the chiller 104 combine at point 206 upstream of the compressor 166 inlet.

The chiller has 164 an associated valve assembly 202 that may be used to control and/or prevent flow of refrigerant to the chiller 164. That is, the valve assembly 202 may be used to isolate the chiller 164 and the coolant circuit 160 from the air conditioning of the thermal management system 158. The chiller valve assembly 202 and the chiller 164 are positioned for parallel flow of refrigerant with the first valve assembly 170, second valve assembly 176 and the corresponding main cabin evaporator 172 and rear auxiliary evaporator 178.

Similar to the previous examples, the chiller valve assembly 164 may be provided as an electronic throttle valve, and the controller 148 may control the chiller valve assembly 202 to prevent refrigerant flow through the chiller 164 or to meter or otherwise permit refrigerant flow through the chiller 164. In some examples, the controller 148 controls the position of the electric throttle valve using a pressure from a pressure sensor (not shown) near the outlet of the chiller 164 on the refrigerant side.

Alternatively, the chiller valve assembly 202 may be provided as a combination of an integrated shutoff valve and an integrated passive throttle valve as described above with respect to the first valve assembly 170, with the shutoff valve located immediately upstream of the passive throttle valve, and the passive throttle valve immediately upstream of an inlet 208 to the chiller 164. The integrated shutoff valve may be mechanically controlled or may be electrically controlled as an on/off valve with two positions. Comparatively, the integrated passive throttle valve may be controlled by a system state, and in one example, a pilot line is connected to an outlet 210 of the chiller to control the position of the throttle valve based on the pressure at the outlet of the chiller.

A front end shutoff valve 212 may also be provided to regulate refrigerant flow to the main cabin evaporator 172 and rear auxiliary evaporator 178. The front end shut off valve 212 may be provided as any of the various valve type described herein, or any valve type suitable to provide desired flow regulation. In some examples, each of the first valve assembly 170, second valve assembly 176, the chiller valve assembly 202, and front end shutoff valve 212 are provided as the same valve assembly type. In other examples, the each of the valve assemblies may be provided as different valve assembly types.

Figure 3:
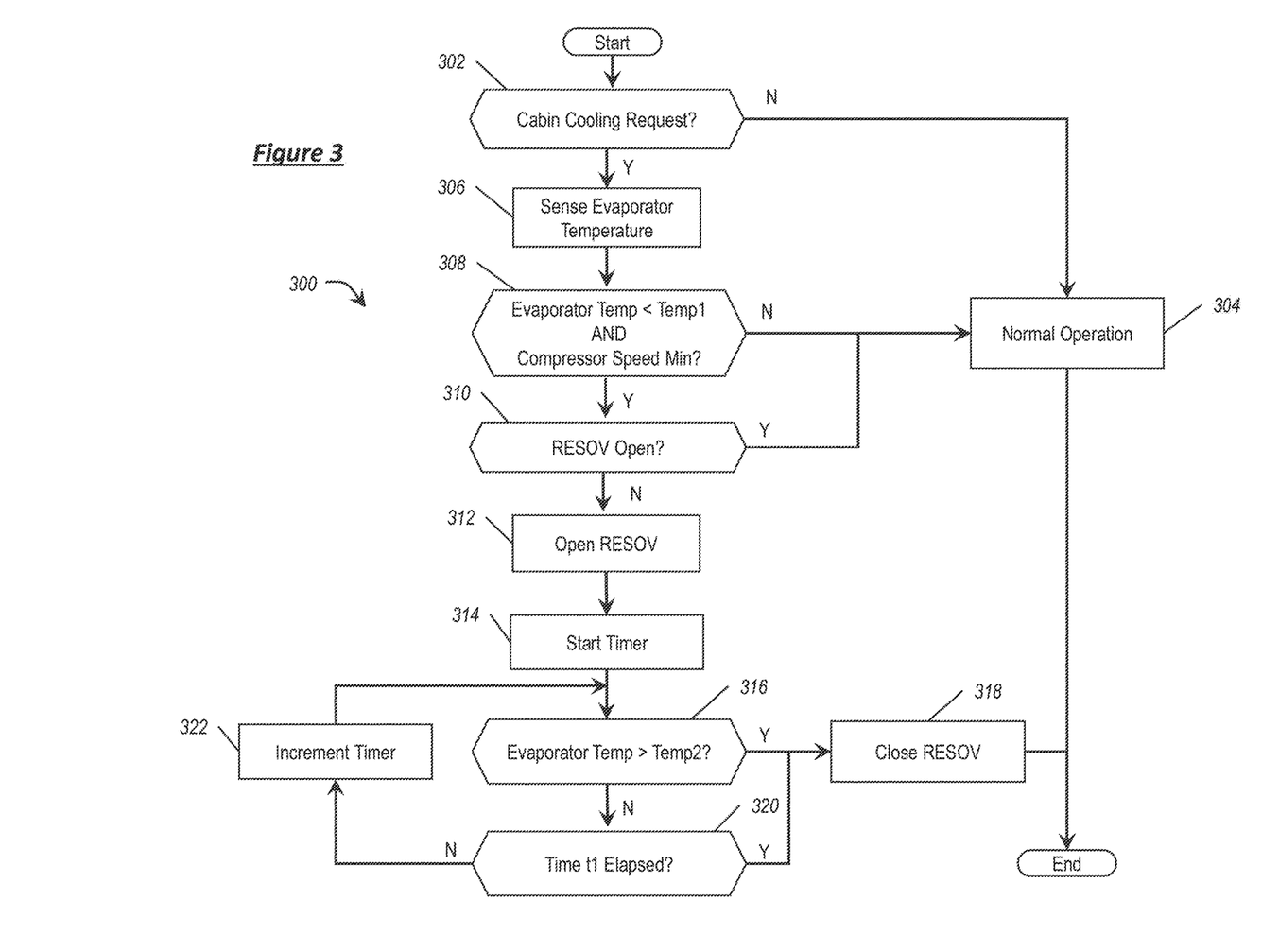
FIG. 3 is a flow chart of an algorithm for controlling the thermal management system.

When the evaporator 172 is operated at temperatures low enough to cause a freezing risk (e.g., ice or condensate may form or there is a risk of ice or condensate forming) the rear evaporator shut off valve 192 can be opened according to the method described with respect to FIG. 3 to allow a portion of the refrigerant to flow through the rear auxiliary evaporator 178 while another portion of the refrigerant or the remainder of the refrigerant flows through the main cabin evaporator 172.

By opening the rear evaporator shut off valve 192, the load on the refrigerant circuit 162 is increased, and a parallel flow path for refrigerant is opened for the refrigerant to flow through. The overall air conditioning capacity of the refrigerant circuit 162 is therefore split between the main cabin evaporator 172 and the rear auxiliary evaporator 178. Flowing refrigerant through both evaporators reduces the effectiveness of the main cabin evaporator 172. As a result of the parallel flow and reduced effectiveness, the evaporator 172 temperature increases, resulting in lower risk of ice or condensate formation and avoiding the need to cycle the compressor 166 on and off.

Previous systems may have been configured to cycle the compressor on and off using timers to prevent formation of ice on the evaporator 172. However, this solution reduces the amount of time the compressor spends cycling between minimum speed and zero speed (e.g., an off state) under low ambient temperature conditions. When the compressor 166 is cycled on and off, discharge air and breath level temperatures may be disturbed. Reducing the on-off cycling of the compressor 166 reduces disturbances in cabin temperature and customer comfort. Each time the compressor 166 is turned back on, an inrush current is caused. Maintaining operation of the compressor as opposed to cycling on and off decreases the occurrence of this inrush current spike. Moreover, reducing the occurrence of compressor cycling improves hardware durability. Keeping the compressor running also prevents certain noise, vibration, and harshness (NVH) issues related to the noise levels of compressor operation while transitioning between zero speed and a non-zero speed.

Referring to FIG. 3, flowchart 300 depicts an algorithm for a method used to control thermal management systems such as those disclosed herein. For example, the method may be implemented by a controller such as the controller and control system discussed above in reference to FIGS. 1 and 2. In other examples, various steps may be omitted, added, rearranged into another order, or performed sequentially or simultaneously. Although the method depicted by flowchart 300 is described with respect to use with a vehicle 112 discussed above, the method may likewise be applied for use with other vehicle configurations having different vehicle components and fluid systems than those described above, as well as vehicles with differing architectures.

At step 302 the algorithm includes determining whether there is a request for air conditioning in the passenger cabin (e.g., from a user request to the HVAC control interface, or from another vehicle system or controller). If no cabin cooling request is present at step 302, the algorithm includes at step 304 operating the thermal management system according to a normal operation protocol without specific mitigation protocols to avoid freezing and/or condensation at the main cabin evaporator.

If at step 302 a cabin cooling request is present, the refrigeration circuit is therefore operating to support the cabin air conditioning system. At step 306 the algorithm includes sensing a temperature of the main cabin evaporator. According to some examples, the controller is configured to receive a signal indicative of the evaporator temperature from the temperature sensor. The controller may additionally receive other data such as ambient temperature, requested cabin temperature, current cabin temperature, and the like. According to more specific examples, evaporator temperature data is passed between two or more controller that influence operation of the thermal management system.

At step 308 the algorithm includes determining if the main cabin evaporator temperature is below a first threshold value Temp1. The value of Temp1 may be set at a specified temperature, for example, five degrees Celsius, two degrees Celsius, zero degrees Celsius, or the like. The value of Temp1 may be stored in a lookup table that is accessible in memory by the controller. In some examples, the first threshold value Temp1 is a set value. In other examples, the first threshold value Temp1 may vary, for example as a function of ambient temperature, and/or other factors. According to a specific example, a temperature threshold is set according to an icing threshold and is generally 0.1 degrees Celsius greater than 15 degrees C. And, for ambient temperatures less than 15 degrees Celsius, the temperature threshold is varied to increase up to as much as 1 degree Celsius at an ambient temperature of 5 degrees Celsius.

At step 308 the algorithm also includes determining whether the compressor is operating at or below a predetermined speed. For example, the controller may determine if the compressor is operating at a speed greater than the minimum operating speed for the compressor, below an offset value above the minimum operating speed for the compressor, and/or within a specified speed range of the minimum speed for the compressor, or the like.

If at step 308 the evaporator temperature is not less than the first threshold value and/or the compressor is not operating at or below a predetermined speed, the algorithm includes proceeding to step 304 and operating the thermal management system without particular mitigating action to avoid freezing at the main cabin evaporator. According to some alternate examples, if the main cabin evaporator temperature is less than the first threshold value and the compressor is not operating at or below a predetermined speed, the controller may be programmed to control the speed of the compressor (e.g., by increasing the speed of the compressor, to increase the load on the main cabin evaporator to cause an increase of the temperature of the evaporator thereby reducing the risk of freezing.

If at step 308 the evaporator temperature is less than the first threshold value Temp1 and the compressor is operating at or below a predetermined speed, the algorithm 300 proceeds to step 310.

At step 310 the algorithm includes determining whether the rear evaporator shutoff valve (RESOV) is currently open. If the RESOV is already open, the rear auxiliary evaporator is already operating, and no additional thermal system loads may be applied by its activation from a non-active state. Thus, the algorithm includes proceeding to step 304 for normal operation in response to the RESOV being open at step 310.

If at step 310 the RESOV is not currently open, the algorithm includes opening the RESOV at step 312 to activate the rear auxiliary evaporator to increase system loads as discussed above. That is, the RESOV is set to an open or partially open position to divert a portion of refrigerant through the rear auxiliary evaporator while another portion of refrigerant flows in parallel through the main cabin evaporator thereby increasing the temperature of the main cabin evaporator.

At step 314 the algorithm includes starting a timer. Generally, the timer operates to allow the algorithm logic to exit freezing mitigation routines if the sensed temperatures are not rising over time. The controller may maintain the first valve assembly and/or second valve assembly in an open or partially open state while the RESOV is opened. In some examples, the compressor is maintained at an operating speed at or near the predetermined speed while the RESOV is open and unless the controller receives an input or reaches a state where an increased compressor speed would be required.

At step 316 the algorithm includes determining whether the main cabin evaporator temperature is greater than a second threshold value Temp2. Generally, the second threshold value Temp2 is greater than the first threshold value Temp1, and may be, for example, on the order of 2-5 degrees Celsius higher than Temp1. If the main cabin evaporator temperature is greater than the Temp2, the algorithm 300 proceeds to step 318.

At step 318, the controller may be programmed to close the RESOV thereby isolating the rear auxiliary evaporator from the refrigerant circuit. At step 218, the controller may be further programmed to reset the timer. From step 318, the algorithm concludes, or alternatively returns to step 302 to continue to monitor the main cabin evaporator.

If at step 316 the main cabin evaporator temperature is not greater than the second threshold value Temp2, the algorithm includes determining at step 320 whether sufficient time duration, t1, has elapsed. The controller may store a set time or a value for a predetermined time duration such as two minutes, five minutes, or another suitable time that allows for the evaporator to warm to decrease the risk of freezing.

If at step 318 the time duration t1 has elapsed, the algorithm proceeds to step 318 as discussed above and closes the RESOV. The algorithm 300 therefore provides for closing the RESOV in response to at least one of (i) the temperature of the main cabin evaporator being above the second predetermined value, and (ii) the timer reaching the predetermined time value.

If at step 318 the time duration t1 has not elapsed, the algorithm includes proceeding to step 322 and incrementing the timer. From step 322, the algorithm returns to step 316.

The method depicted by algorithm 300 therefore provides for a system and a controller that is configured to, while the refrigeration circuit is operating and in response to the temperature of the main cabin evaporator being less than a first threshold value and the compressor operating at a predetermined speed, open the RESOV to divert a portion of refrigerant through the rear auxiliary evaporator while another portion of refrigerant flows in parallel through the main cabin evaporator.

The controller is programmed to, in response to opening the RESOV, start a timer. The controller is also programmed to close the RESOV in response to the timer reaching a predetermined time value. The controller is further programmed to close the RESOV in response to the temperature of the main cabin evaporator increasing to be greater than a second temperature threshold value, where the second threshold value is greater than the first threshold value.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A thermal management system for a passenger cabin of a hybrid vehicle, the thermal management system having a refrigerant loop in fluid communication with a compressor, a condenser, and a chiller, comprising:
    a main cabin evaporator in fluid communication with the refrigerant loop;
    a first valve configured to regulate refrigerant flow through the main cabin evaporator;
    a temperature sensor disposed at the main cabin evaporator and configured to output a signal indicative of a main cabin evaporator temperature;
    an auxiliary evaporator in fluid communication with the refrigerant loop;
    a second valve configured to regulate refrigerant flow through the auxiliary evaporator; and
    a controller programmed to, in response to the main cabin evaporator temperature being less than a first temperature threshold while the main cabin evaporator is operated with the second valve closed and the compressor operating at less than a predetermined operating speed, open the second valve to cycle refrigerant through the auxiliary evaporator to cause an increase in the main cabin evaporator temperature.

2. The thermal management system of claim 1 wherein the controller is further programmed to close the second valve in response to the main cabin evaporator temperature increasing to greater than a second temperature threshold while the second valve is open.

3. The thermal management system of claim 2 wherein the second temperature threshold is 2-5 degrees greater than the first temperature threshold.

4. The thermal management system of claim 1 wherein the controller is further programmed to close the second valve in response to a predetermined time duration having elapsed.

5. The thermal management system of claim 1 wherein first temperature threshold is based on a predetermined buffer greater than a sensed ambient temperature.

6. The thermal management system of claim 5 wherein the predetermined buffer is varied from 0.1 degrees Celsius for a 15 degrees Celsius ambient temperature to 1 degree Celsius for a 5 degrees Celsius ambient temperature.

7. A method of controlling a thermal management system having a plurality of evaporators, the method comprising:

operating a compressor to cycle refrigerant through a refrigerant loop;

opening a first valve to allow refrigerant to flow through a main cabin evaporator;

closing a second valve to prevent refrigerant to flow through an auxiliary evaporator;

sensing a temperature indicative of a main cabin evaporator temperature;

in response to the main cabin evaporator temperature being less than a first temperature threshold while the second valve is closed, opening the second valve to cycle refrigerant through the auxiliary evaporator to cause an increase in the main cabin evaporator temperature; and in response to the main cabin evaporator temperature increasing to greater than a second temperature threshold while the second valve is open, closing the second valve.

8. The method of claim 7 further comprising, closing the second valve in response to refrigerant cycled through the auxiliary evaporator for a predetermined time duration.

9. The method of claim 7 wherein first temperature threshold is based on a buffer temperature greater than a sensed ambient temperature.

10. The method of claim 7 wherein the second temperature threshold is 2-5 degrees greater than the first temperature threshold.

11. A vehicle comprising:
a compressor in fluid communication with a refrigerant loop and operable to generate a refrigerant pressure increase causing flow through the refrigerant loop;
a main cabin evaporator in fluid communication with the refrigerant loop to provide cooling for a first vehicle cabin zone;
a first valve configured to regulate refrigerant flow through the main cabin evaporator;
a temperature sensor disposed at the main cabin evaporator and configured to output a signal indicative of a main cabin evaporator temperature;
an auxiliary evaporator in fluid communication with the refrigerant loop to provide cooling for a second vehicle cabin zone;
a second valve configured to regulate refrigerant flow through the auxiliary evaporator; and
a controller programmed to,
open the first valve and close the second valve in response to a cooling request corresponding to the first vehicle cabin zone to cycle refrigerant through the main cabin evaporator, and
in response to the main cabin evaporator temperature being less than a first temperature threshold while the main cabin evaporator is operated with the second valve closed, open the second valve to cycle refrigerant through the auxiliary evaporator to cause an increase in the main cabin evaporator temperature.

12. The vehicle of claim 11 wherein the controller is further configured to open the second valve in response to the main cabin evaporator temperature being less than the first temperature threshold while the compressor is operated at less than a predetermined operating speed.

13. The vehicle of claim 11 wherein the controller is further programmed to close the second valve in response to the main cabin evaporator temperature increasing to greater than a second temperature threshold while the second valve is open.

14. The vehicle of claim 13 wherein the second temperature threshold is 2-5 degrees greater than the first temperature threshold.

15. The vehicle of claim 11 wherein the controller is further programmed to close the second valve in response to a predetermined time duration having elapsed.

16. The vehicle of claim 11 wherein first temperature threshold is based on a predetermined buffer greater than a sensed ambient temperature.

17. The vehicle of claim 11 wherein the first temperature threshold is varied from 0.1 degrees Celsius greater than ambient for a 15 degrees Celsius ambient temperature to 1 degree Celsius greater than ambient for a 5 degrees Celsius ambient temperature.

\* \* \* \* \*